United States Patent [19]

Lew

[11] Patent Number: 4,879,910

[45] Date of Patent: Nov. 14, 1989

[54] TORSIONAL VIBRATION CONVECTIVE INERTIA FORCE FLOWMETER

[76] Inventor: Hyok S. Lew, 7890 Oak St., Arvada, Colo. 80005

[21] Appl. No.: 88,571

[22] Filed: Aug. 24, 1987

Related U.S. Application Data

[63] Continuation-in-part of Ser. No. 71,777, Jul. 10, 1987, Pat. No. 4,813,289, and a continuation-in-part of Ser. No. 78,206, Jul. 27, 1987, Pat. No. 4,829,832.

[51] Int. Cl.[4] ............................. G01F 1/78; G01F 1/84
[52] U.S. Cl. ................................. 73/861.37; 73/861.38
[58] Field of Search ......................... 73/861.37, 861.38

[56] References Cited

FOREIGN PATENT DOCUMENTS 119638A 9/1984 European Pat. Off. .......... 73/861.38

OTHER PUBLICATIONS

Danfoss Massflo ® Massflowmeter series Mass 1000/1100 catalog, 5/1/86.

Primary Examiner—Michael J. Tokar
Assistant Examiner—Robert P. Bell

[57] ABSTRACT

This invention discloses flowmeters comprising a plurality of flow passage conduits disposed in a generally axisymmetric arrangement about an axis intermediate the inlet and outlet ports of the flowmeter, which flow passage conduits are subjected to torsional vibrations about the axis of axisymmetry, wherein the time rate of flow of materials moving through the plurality of flow passage conduits is determined from the attenuation of the torsional vibrations caused by the convective momentum transfer of the moving materials that carries away the momentum associated with the torsional vibrations or from the difference in the torsional vibratory motions between the upstream and downstream halves of the combination of the flow passage conduits, which difference in the torsional vibratory motions arises from the convective inertia forces of the materials moving through the flow passage conduits acting in two opposing directions in the two halves of the combination of the flow passage conduits.

6 Claims, 5 Drawing Sheets

TORSIONAL VIBRATION CONVECTIVE INERTIA FORCE FLOWMETER

BACKGROUND OF THE INVENTION

This patent application is a Continuation-In-Part application to patent application Ser. No. 071,777 entitled "Convective Attenuation Flowmeter" filed on July 10, 1987 now U.S. Pat. No. 4,813,289 and Ser. No. 078,206 "Convective Inertia Force Flowmeter" filed on July 27, 1987 now U.S. Pat. No. 4,829,832.

In recent years, there has been a remarkable progress in the flow measurement technology, which is exemplified by the development of the Coriolis force flowmeter wherein the mass flow rate of materials moving through the flow passage conduits is determined from the reaction of the flow passage conduits to the lateral vibrations thereof. Without any exceptions, all of the existing Coriolis force flowmeters employ one or two vibrating flow passage conduits. Due to the conditions dictated by the construction and operation of the vibrating flow passage conduits, the size of the vibrating flow passage conduit is limited to a couple inches at most and, consequently, the sizes of the existing Coriolis force flowmeters are limited to two to three inch ports in all practical senses. It is the present state of the art in the Coriolis force flowmeter technology that no one has figured out how to construct and operate a large port size Coriolis force flowmeter, which is in great demand for applications such as crude and refined petroleum custody transfers wherein four, six and eight inch diameter pipes are employed.

BRIEF SUMMARY OF THE INVENTION

The primary object of the present invention is to provide a flowmeter comprising a plurality of flow passage conduits disposed in a generally axisymmetric arrangement about an axis intermediate the inlet and outlet ports of the flowmeter, wherein the flow passage conduits are subjected to torsional vibrations about the axis of axisymmetry and the flow rate is determined from the attenuation of the torsional vibrations or from the inertia force of the moving fluid acting in two opposing directions in the upstream and downstream halves of the combination of the flow passage conduits.

Another object is to provide a flowmeter comprising a plurality of the flow passage conduits disposed in a generally axisymmetric arrangement with the first extremities thereof fixedly connected to the first port section of the flowmeter and second extremities connected to the second port section of the flowmeter in a rotatively flexible arrangement about the axis of axisymmetry, wherein the flow rate is determined from the attenuation of the torsional vibrations imposed on the combinaiton of the flow passage conduits.

A further object is to provide a flowmeter comprising two sets of flow passage conduits connected to one another in series, wherein each set includes a plurality of flow passage conduits disposed in a generally axisymmetric arrangement about an axis with first extremities fixedly secured and second extremities secured in a rotatively flexible arrangement about the axis of axisymmetry, wherein the flow rate is determined from the attenuation of the relative torsional vibrations between the two sets of flow passage conduits.

Yet another object is to provide a flowmeter comprising two sets of flow passage conduits connected to one another in series, wherein each set includes a plurality of flow passage conduits disposed in a generally axisymmetric arrangement about an axis with first extremities fixedly secured and second extremities secured in a rotatively flexible arrangement, wherein the flow rate is determined by comparing the two convective inertia forces in the two sets of flow passage conduits subjected to torsional vibrations relative to one another.

Yet a further object is to provide a flowmeter comprising a plurality of flow passage conduits disposed in a generally axisymmetric arrangement about an axis with first extremities fixedly connected to the first port sections of the flowmeter and second extremities fixedly connected to the second port section of the flowmeter, wherein midsection of the combination of flow passage conduits is rotatively vibrated and the flow rate is determined by comparing the convective inertia forces in the upstream and downstream halves of the combinaiton of the flow passage conduits.

Still another object is to provide a flowmeter including two sets of flow passage conduits disposed in a parallel arrangement about a common axis, wherein each set includes a plurality of flow passage conduits disposed in a generally axisymmetric arrangement about the common axis of axisymmetry with first extremities fixedly secured to the first port section of the flowmeter and second extremities fixedly secured to the second port section of the flowmeter, wherein the midsections of the two sets of flow passage conduits are rotatively vibrated relative to one another in opposing directions and the flow rate is determined by comparing the two relative torsional vibratory motions between the two sets of flow passage conduits respectively occuring at the upstream and downstream halves of the sets of flow passage conduits.

Still a further object is to provide a flowmeter invention and design that is compatible with flowmeters of small port sizes as well as those of large port sizes.

These and other objects of the present invention will become clear as the description thereof proceeds.

BRIEF DESCRIPTION OF THE FIGURES

The present invention may be described with a great clarity and specificity by referring to the following figures.

OPERATING PRINCIPLES OF THE INVENTION

Figure 1:
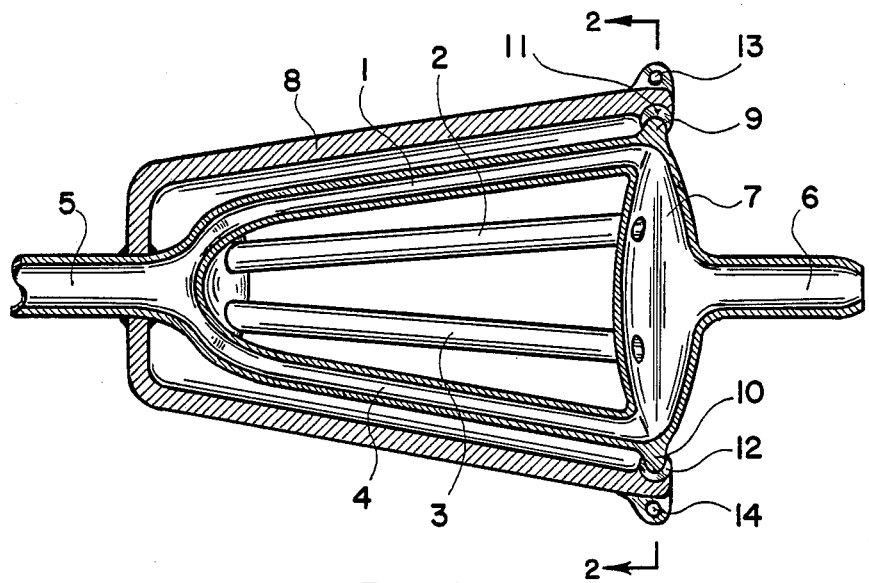
FIG. 1 illustrates a cross section of an embodiment of the nozzle type convective inertia force flowmeter of the present invention.

The primary structure of the convective inertia force flowmeter of the present invention comprises a plurality of conduits disposed in a generally axisymmetric arrangement about an axis wherein two extremeties of each conduit are respectively connected to two headers. The plurality of conduits are vibrated rotatively about the axis of axisymmetry by a means exerting alternating torques about the axis of axisymmetry such as an electromagnetic torque generator. The motion of the fluid moving through one of the plurality of conduits is governed by the equation of motion $$\rho \frac{\partial w}{\partial t} + \rho U \frac{\partial w}{\partial x} = -\frac{1}{R} \frac{\partial p}{\partial \theta}, \qquad (1)$$

where $\rho$ is the density of the fluid; w is the velocity of the torsional vibration; t is the time; U is the convective velocity of the fluid moving through the conduit; x is the coordinate parallel to the central axis of the conduit; p is the pressure of the fluid; and $\theta$ is the angular coordinate about the axis of the torsional vibration. When equation (1) is integrated over the cross sectional area of the conduit and the divergence theorem is used to convert the surface integral involving the pressure p to the line integral, the following equation is obtained:

$$\rho A \frac{\partial w}{\partial t} + \rho U A \frac{\partial w}{\partial x} = F, \qquad (2)$$

where A is the cross sectional area of the conduit and F is the force exerted on the fluid column of unit length in the conduit by the wall of the conduit under vibration, which force is equal in magnitude and opposite in direction to the force exerted on the unit length of the conduit by the fluid in the conduit. The total force W on the conduit is the sum of the force F exerted by the fluid contained in the conduit and the electromagnetic force G exerted by the rotary vibrator, which total force can be written in the form when use of equation (2) is made $$W = \left( G - \rho A \frac{\partial w}{\partial t} \right) - \rho U A \frac{\partial w}{\partial x}. \qquad (3)$$

The torsional vibratory motion of the conduit is given by the equation $$EI \frac{\partial^4 s}{\partial x^4} + m \frac{\partial^2 s}{\partial t^2} = W, \qquad (4)$$

where E is the elastic modulus of the material of the conduit wall; I is the moment of inertia of the cross sectional area of the conduit wall; s is the linear deflection of the conduit associated with the torsional vibrations about the axis of axisymmetry and related to w by equation w=∂s/∂t, and m is the linear density of the conduit. In general, equation (4) can be solved after substituting equation (3) into the right hand side thereof and, consequently, the mode of vibrations of the conduit can be described by precise mathematical expressions. It is not difficult to analyze the effect of the convective inertia force of the fluid moving through the conduit on the torsional vibrations of the conduit without actually solving the differential equation (4). When one examines equations (3) and (4), there is only one term that depends on the convective velocity of the fluid U, which is the convective inertia force $$\text{Convective inertia force} = -\rho U A \frac{\partial w}{\partial x}. \qquad (5)$$

In the convective inertia force flowmeter of the present invention the lateral velocity w of the conduits associated with the torsional vibration about the axis of axisymmetry is a function of the axial coordinate x. In general, equation (5) can be written in the form for the convective inertia force flowmeter of the present invention $$\text{Convective inertia force} = -Cf(\rho UA), \qquad (6)$$

where C is a constant of proportionality intrinsic to the mechanical arrangement of the flow passage conduits subjected to the torsional vibrations, which constant can be determined by the calibration procedure of the flowmeter, and f is the frequency of the torsional vibration. According to equation (6), the mass flow rate ($\rho UA$) is directly proportional to the convective inertia force and, consequently, the former can be determined from the latter when the latter is isolated from the other forces on the flow passage conduits appearing in equations (3) and (4). The method for isolating and measuring the convective inertia force will be explained when the illustrated embodiments of the present invention are described in the following section.

Another method taught by the present invention for determining the mass flow rate from the torsional vibrations of the flow passage conduits disposed in a generally axisymmetric arrangement involves the detection of the attenuations in the torsional vibrations caused by the convective transfer of the momentum or energy associated with the torsional vibrations generated intermittently by the electromagnetic torque generator. The kinetic energy of the torsional vibration is equal to $$e = K_1 \tfrac{1}{2} M <w>^2, \tag{7}$$

where $K_1$ is a constant of proportionality intrinsic to the mechanical arrangement of the flow passage conduits and $<w>$ is the amplitude of the space averaged value of the velocity of the torsional vibration of the flow passage conduits about the axis of axisymmetry. The time rate of convective transfer of the kinetic energy associated with the torsional vibration is equal to $$\left.\frac{de}{dt}\right)_{conv.} = K_2 \tfrac{1}{2} \rho <w>^2 UA, \tag{8}$$

where $K_2$ is a constant of proportionality. The time rate of energy dessipation in the torsional vibration due to the viscosity $\mu$ in the system is equal to $$\left.\frac{de}{dt}\right)_{damp.} = K_3 \mu <w>^2, \tag{9}$$

where $K_3$ is a constant of proportionality. The time rate of decrease of the kinetic energy given by equation (7) has to be equal to the sum of the right hand sides of equation (8) and (9), which relation yields a differential equation $$K_1 M \frac{d<w>}{dt} + \left(\frac{K_2}{2} \rho UA + K_3 \mu\right) <w> = 0, \tag{10}$$

which has a general solution of the form $$w = <w>_0 \exp.[-(C_1 + C_2 \rho UA)t], \tag{11}$$

where $<w>_0$ is the initial value of the amplitude of the space averaged velocity $<w>$; and $C_1$ and $C_2$ are constants of proportionality intrinsic to the mechanical arrangement of the flow passage conduits, which are determined by the calibrating procedure of the flowmeter. According to equation (11), the amplitude of the torsional vibration decays as an exponential function of the mass flow rate ($\rho UA$). Therefore, the mass flow rate can be determined from the decay of the torsional vibration caused by the convective momentum or energy transfer.

A further method taught by the present invention for determining the mass flow rate from the torsional vibrations of the flow passage conduits disposed in a generally axisymmetric arrangement involves the measurement of the output electromotive force $V_{out}$ generated by a transducer detecting the motion of the torsional vibration, which torsional vibrations are continuously generated by an electromagnetic torque generator energized by a known amount of electric energy input electromotiveforce $V_{in}$. According to equations (8) and (9), the time rate of kinetic energy loss from the torsional vibrations is equal to $$\left.\frac{de}{dt}\right)_{loss} = \left(\frac{K_2}{2} \rho UA + K_3 \mu\right) <w>^2. \tag{12}$$

The output emf generated by the transducer of the motion detector is proportional to $<w>$. Hence, equation (12) can be written in the form $$\left.\frac{de}{dt}\right)_{loss} = K_4(\tfrac{1}{2} \rho UA + K_5)(V_{out})^2, \tag{13}$$

where $K_4$ and $K_5$ are constants of proportionality. The time ratof energy addition to the torsional vibrations by the electromagnetic torque generator is equal to $$\left.\frac{de}{dt}\right)_{add} = K_6(V_{in})^2, \tag{14}$$

where $K_6$ is a constant of proportionality. The right hand side of equation (13) is equal to that of equation (14), which condition yields equation $$\rho UA = C_3 \left(\frac{V_{in}}{V_{out}}\right)^2 - C_4, \tag{15}$$

where $C_3$ and $C_4$ are constants of proportionality intrinsic to the mechanical arrangement of the flow passage conduits and electrical characteristics of the transducer and the torque generator. According to equation (15), the mass flow rate can be determined from the ratio of the energy input to the energy output. The constants of proportionality appearing in equation (15) can be determined by the calibrating procedure of the flowmeter.

DESCRIPTION OF THE ILLUSTRATED EMBODIMENTS

In FIG. 1 there is illustrated a cross section of an embodiment of the nozzle type convective inertia force flowmeter constructed in accordance with the principles of the present invention. This convective inertia force flowmeter comprises a plurality of flow passage conduits 1, 2, 3, 4, etc. disposed in a generally axisymmetric arrangement about an axis coinciding with the common central axis of the inlet conduit section 5 and the outlet nozzle 6. The first extremities of the flow passage conduits 1, 2, 3, 4, etc. are affixedly connected to the inlet conduit 5, while the second extremities are connected to a hollow disc header 7, from which the discharge nozzle 6 extends in a coaxial arrangement. It should be mentioned that a hollow ring header with one or more connecting conduits to the discharge nozzle may be employed in place of the hollow disc header 7. The combination of the flow passage conduits, hollow disc header, and the discharge nozzle is supported in a cantilever arrangement by the frame 8 of a shell structure that anchors the intake conduit 5. The hollow disc header 7 includes ferromagnetic elements 9 and 10 respectively reacting to the electromagnets 11 and 12 affixed to the frame 8, which also includes securing means such as bolt holes 13 and 14 for anchoring the flowmeter assembly to a rigid structure.

Figure 2:
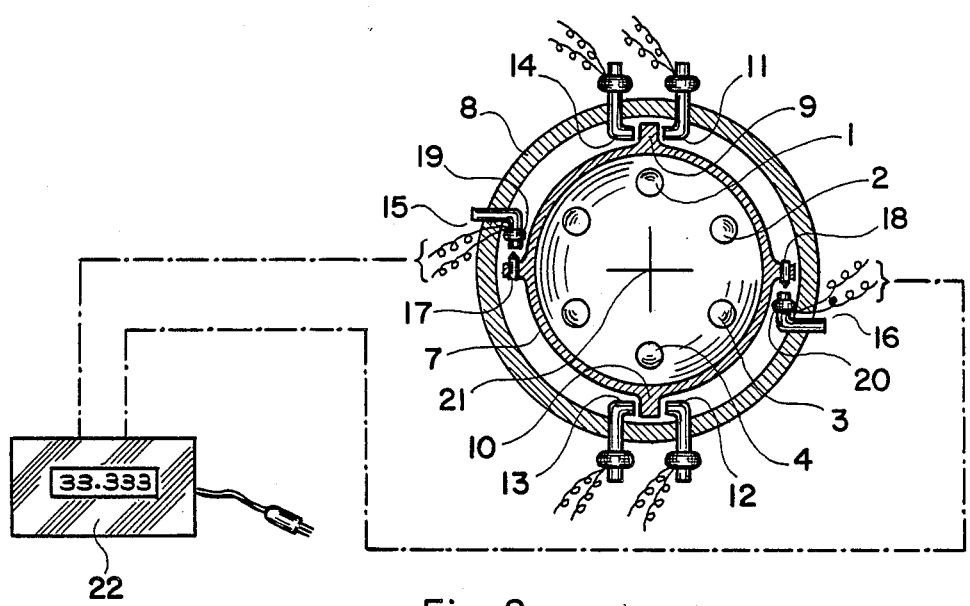
FIG. 2 illustrates another cross section of the embodiment shown in FIG. 1.

In FIG. 2 there is illustrated another cross section of the embodiment shown in FIG. 1, which cross section is taken along plane 2—2 as shown in FIG. 1. The ferromagnetic elements 9 and 10 affixed to the hollow disc header 7 may be respectively driven by the two single electromagnets 11 and 13, or by the two pairs of electromagnets 9–14 and 12–13 wherein the two magnets included in each pair are alternatively energized by alternating electric currents. The motion detectors 15 and 16 respectively includes the permanent magnet targets 17 and 18 affixed to the hollow disc header 7 and pick-up coils 19 and 20 affixed to the frame 8. It should be mentioned that other types of motion detectors may be employed in place of the magnetic motion detectors included in the particular illustrative embodiment.

The convective inertia force flowmeter illustrated in FIGS. 1 and 2 determines the flow rate of the fluid moving therethrough from one or more of the following three different informations:

The first information, from which the flow rate can be determined is the "amplitude of the in-phase component of the vibration". When equation (3) and the relation $w = \partial s/\partial t$ are substituted into equation (4), equation (4) can be written in the form:

$$EI \frac{\partial^4}{\partial x^4} \int w \, dt + (m + \rho A) \frac{\partial w}{\partial t} + \rho UA \frac{\partial w}{\partial x} = G_0 \sin \omega t, \quad (16)$$

where $G = G_o \sin \omega t$ represents alternating torques exerted by the electromagnetic rotary vibrator. It is readily noticed that the first and second terms on the left hand side of equation (16) are related to the component of the velocity w 180 degrees out of phase from the torque function on the right hand side of equation (16). The last term on the left hand side of equation (16) representing the convective inertia force has velocity component in phase with the oscillating torque generated by the electromagnetic rotary vibrator. The in-phase component of the torsional vibration of the flow passage conduit assembly about the axis of axisymmetry 21 can be isolated by an electronic vibration analyzer and the mass flow rate can be determined therefrom, as the amplitude of the in-phase component of the torsional vibration is proportional to the mass flow rate. The constant of proportionality included in the relation between the mass flow rate and the in-phase component of the torsional vibration is determined by calibrating the flowmeter. For the embodiment shown in FIGS. 1 and 2, the primary or out of phase component of the velocity w of the torsional vibration increases as the distance x measured from the fixed end thereof increases and can be expressed by a relationship $$w_{o.p.} = w_0 \left(\frac{x}{L}\right)^n \cos \omega t, \quad (17)$$

where $w_o$ is the amplitude of the primary component or the out of phase component of the torsional vibration about the axis of axisymmetry 21; L is the length of the individual flow passage conduit; and n is a constant intrinsic to the mechanical arrangement of the flow passage conduits. Substitution of equation (17) into equation (5) yields $$\text{Convective inertia force} = -(\rho UA) \frac{n w_0}{L} \left(\frac{x}{L}\right)^{n-1} \cos \omega t, \quad (18)$$

which convective inertia force generates in-phase component of the torsional vibration proportional thereto given by equation $$w_{i.p.} = w_1(\rho UA) \left(\frac{x}{L}\right)^m \sin \omega t, \quad (19)$$

where $w_1$ is a constant of proportionality and m is a constant intrinsic to the mechanical arrangement of the flow passage conduit. The constant $w_1$ is empirically determined by calibrating the flowmeter. Equation (19) is the theoretical basis for determining the mass flow rate from the amplitude ⁓⁓⁓ of the in-phase component of the torsional motion. In actual practice, the functional relationship between the mass flow rate and the amplitude of the in-phase component of the torsional vibration should be determined empirically rather than by theoretical analysis.

The second information from which the flow rate can be determined is the decay of the torsional vibration generated intermittently by the electromagnetic rotary vibrator as shown by equation (11). In actual practice, the relationship between the mass flow rate and the decay of the torsional vibrations must be determined empirically.

The third information from which the flow rate can be determined is the ratio of the output electromotive force from the motion detector to the input electromotive force continuously supplied to the electromagnetic rotary vibrator as shown by equation (15), or from the ratio of the magnitude of the torsional vibrations of the plurality of flow passage conduits to the magnitude of the torque exerted by the rotary vibrator. In actual practice, the relation between the mass flow rate and the ratio of kinetic energy belonging to the torsional vibration to the electromagnetic energy continuously supplied to the electromagnetic rotary vibrator should be determined empirically. The signals from the motion detectors 15 and 16 are supplied to a data processor 22, wherein it is processed and converted to data directly related to the flow rate, which data may be displayed or transferred to other equipment controlling the fluid flow. It should be mentioned that the plurality of the flow passage conduits 1, 2, 3, 4, etc. shown in FIGS. 1 and 2 may be disposed axisymmetrically on a cylindrical surface of a constant diameter instead of the conical surface shown in the particular illustrative embodiment and that the flow passage conduits may be a curved conduit instead of a straight conduit.

Figure 3:
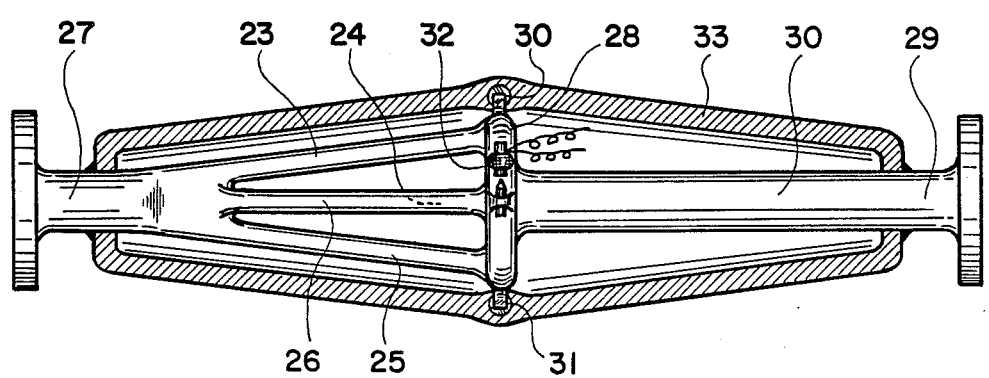
FIG. 3 illustrates an embodiment of an in-line convective inertia force flowmeter of the present invention.

In FIG. 3 there is illustrated an embodiment of the in-line convective inertia force flowmeter of the present invention, which comprises a plurality of flow passage conduits 23, 24, 25 and 26 disposed in a generally axisymmetric arrangement about an axis with first extremities fixedly connected to the first port conduit 27 and second extremities fixedly connected to a radially extending header 28. The radially extending header 28, which may be a hollow disc header or hollow ring header, is connected to the second port conduit 29 in a rotatively flexible arrangement by a torsion conduit 30, which is a thin walled tubing or other rotatively flexible tubing. The electromagnetic rotary vibrator including electromagnetic drives 30 and 31 and the motion detector 32 having the same construction and working principles as those explained in conjunction with FIG. 2 are affixed in part to the radially extending header 28 and in part to the frame 33 of shell structure securing the two port conduits 27 and 29 in a rigid arrangement. The convective inertia force flowmeter illustrated in FIG. 3 operates on one or more of the three principles described in conjunction with the embodiment shown in FIGS. 1 and 2.

Figure 4:
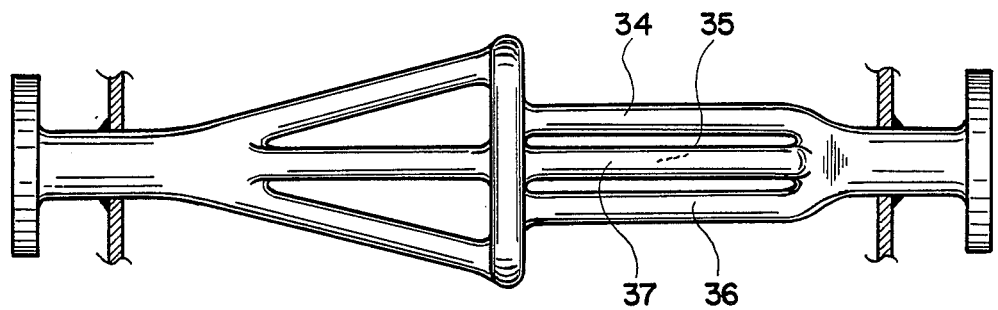
FIG. 4 illustrates another embodiment of the in-line convective inertia force flowmeter of the present invention.

In FIG. 4 there is illustrated another embodiment of the in-line convective inertia force flowmeter which has essentially the same construction and operates on the same principles as the embodiment shown in FIG. 3 with one exception. In place of the single torsion conduit 30 shown in FIG. 3, a plurality of torsion conduits 34, 35, 36 and 37 are employed, which torsion conduits are disposed close to and in a generally axisymmetric arrangement about the same axis of axisymmetry as that of the plurality of the flow passage conduits. For the brevity of the illustration, the rotary vibrator and the motion detector as well as the frame of shell structure are not shown in FIG. 4.

Figure 5:
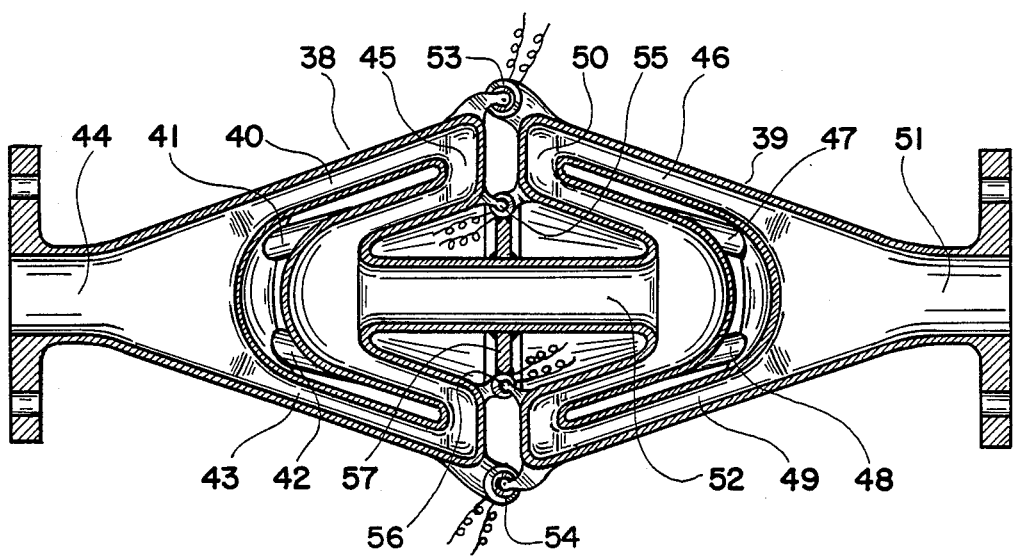
FIG. 5 illustrates a cross section of an embodiment of the balanced version of the convective inertia force flowmeter of the present invention.

In FIG. 5 there is illustrated a cross section of an embodiment of the balanced version of the convective inertia force flowmeter of the present invention, which comprises two sets of pluralities of flow passage conduits 38 and 39 disposed in a mirror image to one another about a plane perpendicular to the central axis of the flowmeter. The first combination 38 of the flow passage conduits includes a plurality of flow passage conduits 40, 41, 42, 43, etc. disposed in a generally axisymmetric arrangement about the central axis of the flowmeter with the first extremities of the flow passage conduits fixedly connected to the first port conduit 44 and second extremities fixedly connected to a first radially extending header 45, which may be a hollow disc header with a cupped center portion as shown in the particular illustrative embodiment. The second combination 39 of the flow passage conduits includes a plurality of flow passage conduits 46, 47, 48, 49, etc. disposed in a generally axisymmetric arrangement about the central axis of the flow meter with first extremities fixedly connected to a second radially extending header 50 and second extremities fixedly connected to the second port conduit 51. The two radially extending headers 45 and 50 are connected to one another by a torsion conduit 52 disposed coaxially with respect to the central axis of the flowmeter. The rotary vibrator including electromagnets 53 and 54 rotatively vibrates the two combinations of the flow passage conduits 38 and 39 relative to one another in opposing directions. The motion detectors 55 and 56 detect rotary motions of the two combinaitons of the flow passage conduits 38 and 39 relative to one another or relative to the stationary disc 57 affixed to the midsection of the torsion conduit, which may be secured to the stationary frame of the flowmeter anchoring the two port conduits 44 and 51 that is not shown for the brevity of the illustration. The driving force appearing on the right hand side of equation (16) and the local inertia force of the fluid and conduits given by the second term on the left hand side of equation (16) is antisymmetric between the two combinations of the flow passage conduits 38 and 39, while the convective inertia force proportional to the mass flow rate given by the third term on the left hand side of equation (16) is symmetric therebetween for the embodiment shown in FIG. 5. Firstly, mass flow rate can be determined from the symmetric component of the torsional vibration of the two combinations of flow passage conduits. Secondly, the mass flow rate can be determined from the decay of the relative or absolute torsional vibrations of the combinations of flow passage ocnduits, which vibrations are generated by the electromagnetic rotary vibrator intermittently energized by alternating electric currents. Thirdly, the mass flow rate can be determined from the ratio of kinetic energy belonging to the torsional vibrations of the plurality of flow passage conduits to the electromagnetic energy continuously energizing the electromagnetic rotary vibrator. The single torsion conduit 52 may be replaced by a plurality of torsion tubes as demonstrated in FIG. 4.

Figure 6:
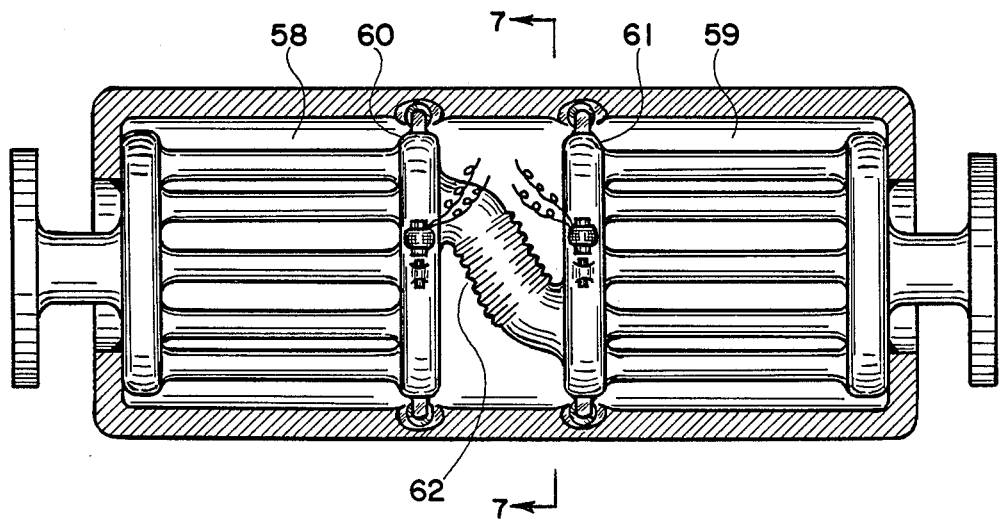
FIG. 6 illustrates another embodiment of the balanced convective inertia force flowmeter of the present invention.

In FIG. 6 there is illustrated another embodiment of the balanced version of the connective inertia force flowmeter of the present invention that has essentially the same construction and operating principles as those of the embodiment shown in FIG. 5 with a few minor exceptions in the construction. The plurality of flow passage conduits included in each of the two combinations 58 and 59 thereof are disposed on a cylindrical surface of a constant radius in place of the conical surface employed in the embodiment shown in FIG. 6. The pair of radially extending headers 60 and 61 rotatively vibrated relative to one another in opposing directions are connected to one another by one or more flexible couplings 62 such as a bellow coupling, that allows relative rotary motions therebetween.

Figure 7:
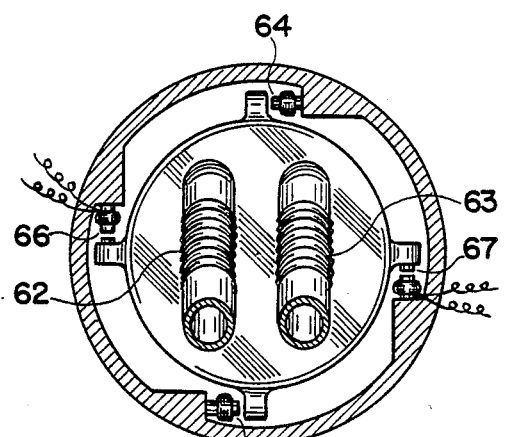
FIG. 7 illustrates a cross section of the embodiment shown in FIG. 6.

In FIG. 7 there is illustrated another cross section of the embodiment shown in FIG. 6 taken along plane 7-7 as shwon in FIG. 6. In this cross sectional view, a pair of flexible couplings 62 and 63, a rotary vibrator including a pair of electromagnets 64 and 65, and a rotary motion detector including a pair of transducers 66 and 67 are clearly illustrated. The convective inertia force flowmeter illustrated in FIGS. 6 and 7 determines the mass flow rate in one or more methods described in conjunction with FIG. 5.

Figure 8:
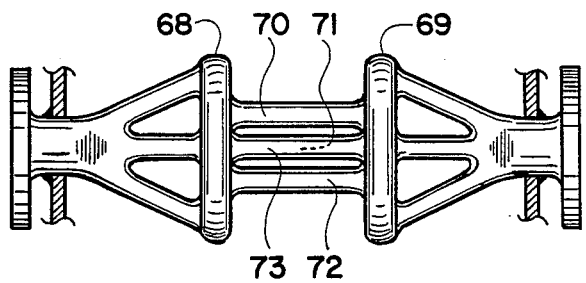
FIG. 8 illustrates a further embodiment of the balanced convective inertia force flowmeter of the present invention.

In FIG. 8 there is illustrated a further embodiment of the balanced version of the convective inertia force flowmeter having the same construction and operating principles as the embodiment shown in FIG. 5 with one exception. The pair of radially extending headers 68 and 69 rotatively vibrated relative to one another in opposing directions are connected to one another by a plurality of torsion conduits 70, 71, 72 and 73 disposed closely to and about the central axis of the flowmeter. For the brevity of the illustration, the rotary vibrator and the rotary motion detector are not shown in FIG. 8.

Figure 9:
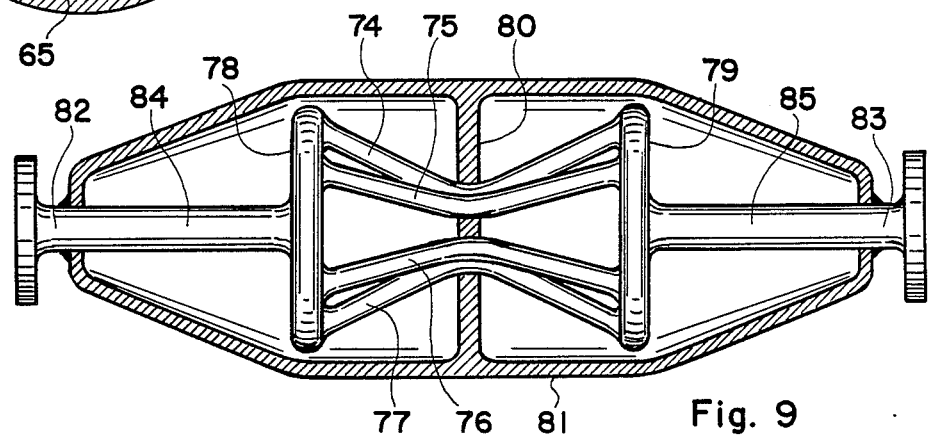
FIG. 9 illustrates yet another embodiment of the balanced convective inertia force flowmeter of the present invention.

In FIG. 9 there is illustrated yet another embodiment of the balanced version of the convective inertia force flowmeter of the present invention, which includes a plurality of flow passage conduits 74, 75, 76, 77, etc. disposed in a generally axisymmetric arrangement about the central axis of the flowmeter, wherein two extremities of the flow passage conduits are respectively connected to the two radially extending headers 78 and 79 vibrated relative to one another in opposing directions by a rotary vibrator that is not shown, while the midsections thereof are secured to a plate 80 affixed to the frame 81 of the shell structure anchoring the two port conduits 82 and 83. The two radially extending headers 78 and 79 are respectively connected to the two port conduits 82 and 83 by a pair of torsion conduits 84 and 85. It should be understood that the midsections of the flow passage conduits may not be secured to the plate 80 and that the two single torsion conduits 84 and 85 may be replaced by two sets of pluralities of torsion conduits, respectively, as demonstrated in FIG. 8. It should be mentioned that the curved flow passage conduits may be replaced by straight flow passage conduits. The mass flow rate is determined from the rotary motions of the two radially extending headers 78 and 79 in one or more methods described in conjunction with FIG. 5.

Figure 10:
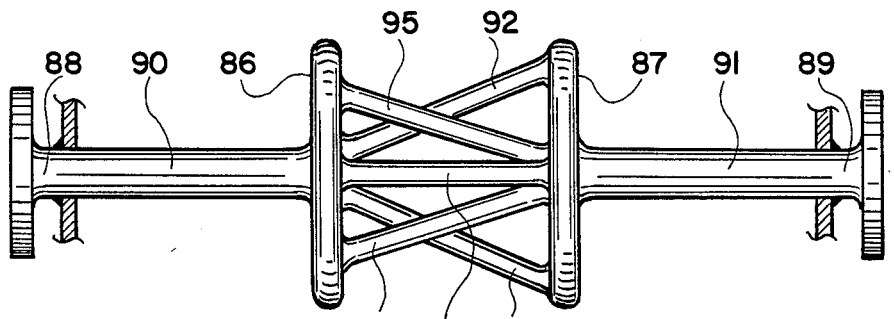
FIG. 10 illustrates yet a further embodiment of the balanced convective inertia force flowmeter of the present invention.

In FIG. 10 there is illustrated yet a further embodiment of the balanced version of the convective inertia force flowmeter of the present invention having a construction similar to and having the same operating principles as the embodiment shown in FIG. 9. The two radially extending headers 86 and 87 rotatively vibrated relative to one another in opposing directions by an electromagnetic rotary vibrator are respectively connected to the two port conduits by the two torsion conduits 90 and 91. The first set of flow passage conduits 92, 93, 94, etc. extending from the central portion of the first radially extending header 86 in a generally axisymmetric arrangement about the central axis of the flowmeter are fixedly connected to the peripheral portion of the second radially extending header 87. The second set of the flow passage conduits 95, 96, etc. extending from the central portion of the second radially extending header 87 in a generally axisymmetric arrangement about the central axis of the flowmeter are fixedly connected to the peripheral portion of the first radially extending header 86, wherein the flow passage conduits in one set are routed through the space between the flow passage conduits of the other set. The flow passage conduits disposed intermediate the two headers may be curved rather than straight.

Figure 11:
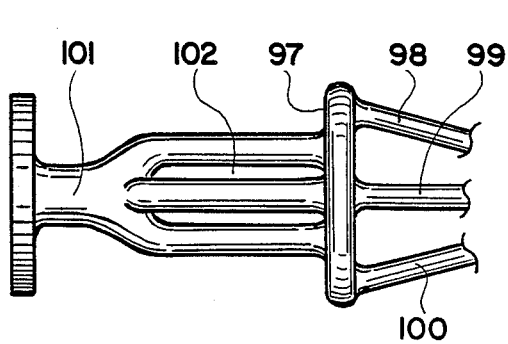
FIG. 11 illustrates an embodiment of the disc or ring header securing a plurality of flow passage conduits to a port section of the flowmeter in a rotatively flexible arrangement.

In FIG. 11 there is illustrated an embodiment of the radially extending header that may be employed in place of the corresponding elements shown in FIGS. 9 and 10. The radially extending header 97 including the plurality of the flow passage conduits 98, 99, 100, etc. is connected to a port conduit 101 by a plurality of torsion conduits 102 disposed near to the central axis of the com combination including the radially extending header 97 and the plurality of flow passage conduits 98, 99, 100, etc.

Figure 12:
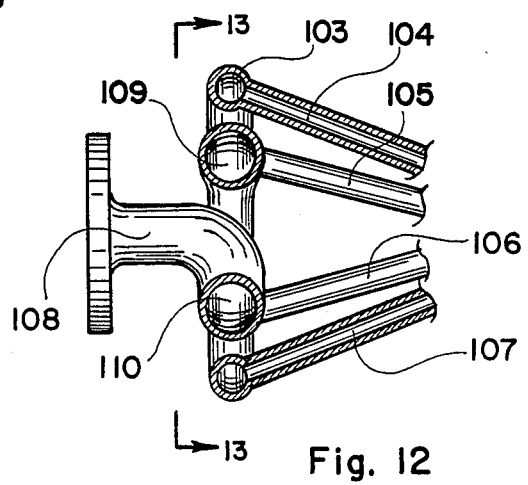
FIG. 12 illustrates another embodiment of the disc or ring header securing a plurality of flow passage conduits to a port section of the flowmeter in a rotatively flexible arrangement.

In FIG. 12 there is illustrated a cross section of another embodiment of the radially extending header that may be employed in place of the corresponding elements shown in FIGS. 3, 4, 5, 6, 8, 9 and 10. In this embodiment, the ring header 103 connected to a plurality of the flow passage conduits 104, 105, 106, 107, etc. are connected to a port conduit 108 by a flexible coupling such as a bellow coupling, that connects the two tangential ports 109 and 110 respectively extending from the ring header 103 and port conduit 108.

Figure 13:
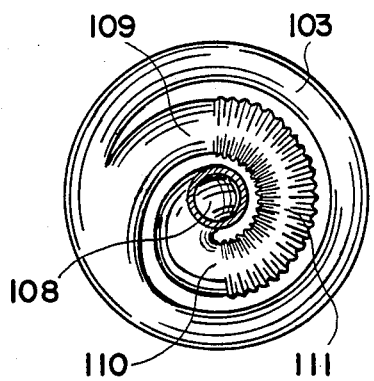
FIG. 13 illustrates a cross section of the disc or ring header shown in FIG. 12.

In FIG. 13 there is illustrated another cross section of the embodiment shown in FIG. 12 taken along plane 13-13 as shown in FIG. 12, which shows a bellow coupling 111 connecting the two tangential ports 109 and 110 respectively extending from the ring header 103 and the port conduit 108.

Figure 14:
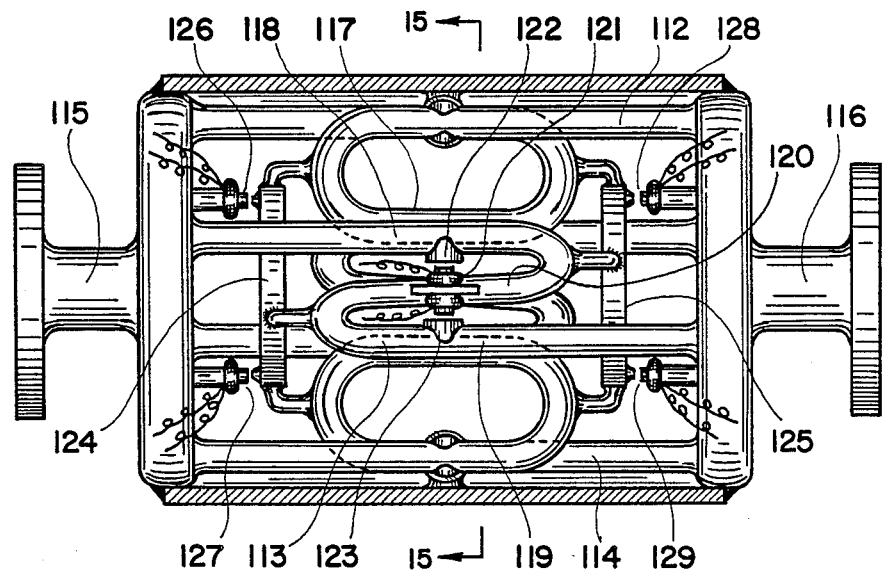
FIG. 14 illustrates an embodiment of the convective inertia force flowmeter of the present invention comprising a plurality of flow passage conduits with built-in torsional flexibility.

In FIG. 14 there is illustrated an embodiment of the convective inertia force flowmeter of the present invention including a plurality of flow passage conduits wherein the torsional flexibility is provided by the lateral flexibility of the flow passage conduits. Each of the plurality of flow passage conduits 112, 113, 114, etc. disposed in a generally axisymmetric arrangement about the central axis of the flowmeter with two extremities respectively conencted to the two port conduits 115 and 116 includes a 360 degree loop 117 disposed intermediate the two extremities. Two extremities 118 and 119 of the 360 degree loop 120 are spaced from one another, whereby they can be vibrated relative to one another in opposing directions by an electromagnet 121 disposed therebetween, which attracts the ferromagnetic elements 122 and 123 respectively affixed to the two extremities 118 and 119 of the 360 degree loops. The plurality of flow passage conduits 112, 113, 114, etc. are joined together by a pair of discs or rings 124 and 125 respectively secured to the two extremities of the 360 degree loopes of the plurality of flow passage conduits. A pair of rotary motion detectors respectively including transducers 126 and 127, and 128 and 129, measure the velocity of the torsional vibrations of the combination of the plurality of flow passage conduits.

Figure 15:
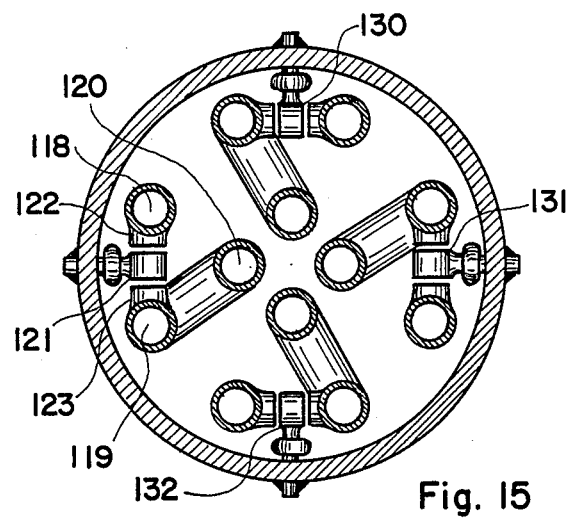
FIG. 15 illustrates a cross section of the embodiment shown in FIG. 14.

In FIG. 15 there is illustrated a cross section of the embodiment shown in FIG. 14 taken along plane 15-15 as shown in FIG. 14. The electromagnets 121, 130, 131 and 132 respectively disposed intermediate the two extremities of the 360 degree loop included in each flow passage conduit, which are energized by alternating electric currents in unison, vibrate the combination of the first halves of the flow passage conduit joined together by the disc 124 and the combination of the second halves of the flow passage conduits joined together by the disc 125 relative to one another in opposing directions. The mass flow rate is determined from the motions of the two discs 124 and 125 by one or more methods described in conjunction with FIG. 5. It should be mentioned that the flow passage conduits may be fixedly connected directly to the two port conduits 115 and 116 as shown in FIG. 16.

Figure 16:
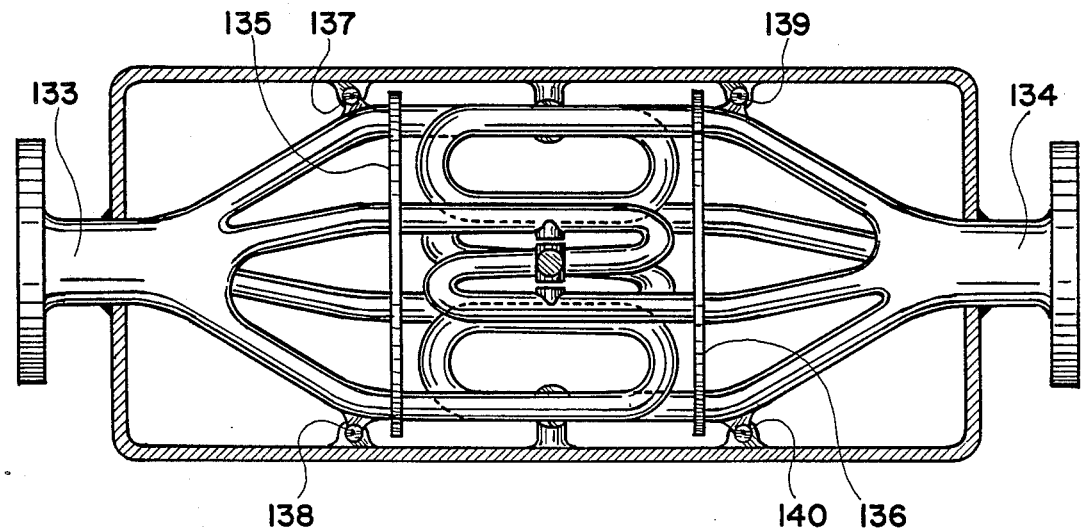
FIG. 16 illustrates another embodiment of the convective inertia force flowmeter of the present invention comprising a plurality of flow passage conduits with built-in torsional flexibility.

In FIG. 16 there is illustrated another embodiment of the convective inertia force flowmeter of the present invention wherein the torsional flexibility is provided by the lateral flexibility of the flow passage conduits, which has essentially the same construction and operates on the same principles as the embodiment shown in FIGS. 14 and 15 with two exceptions. Firstly, the extremities of flow passage conduits are directly connected to the two port conduits 133 and 134. Secondly, the first and second halves of the flow passage conduits are respectively joined together by two discs or rings 135 and 136, which are secured to the flow passage conduits intermediate one extremity and the 360 degree loop and the other extremity. The transducers 137, 138, 139 and 140 of the motion detectors may use targets affixed to the flow passages adjacent to the joining discs or rings 135 and 136. It should be mentioned that the first and second halves of the flow passage conduits may be further joined respectively by two additional joining discs or rings disposed adjacent to one another at the mid-section of the flowmeter assembly, wherein the first joining disc or ring joins the first extremities of the 360 degree loops together and the second joining disc or ring joins the second extremities thereof together. In such an arrangement applicable to the embodiments shown in FIGS. 15 and 16, the rotary vibrator employing two or less electromagnets should vibrate the two additional joining discs or rings relative to one another in opposing directions rather than individual flow passage conduits.

Figure 17:
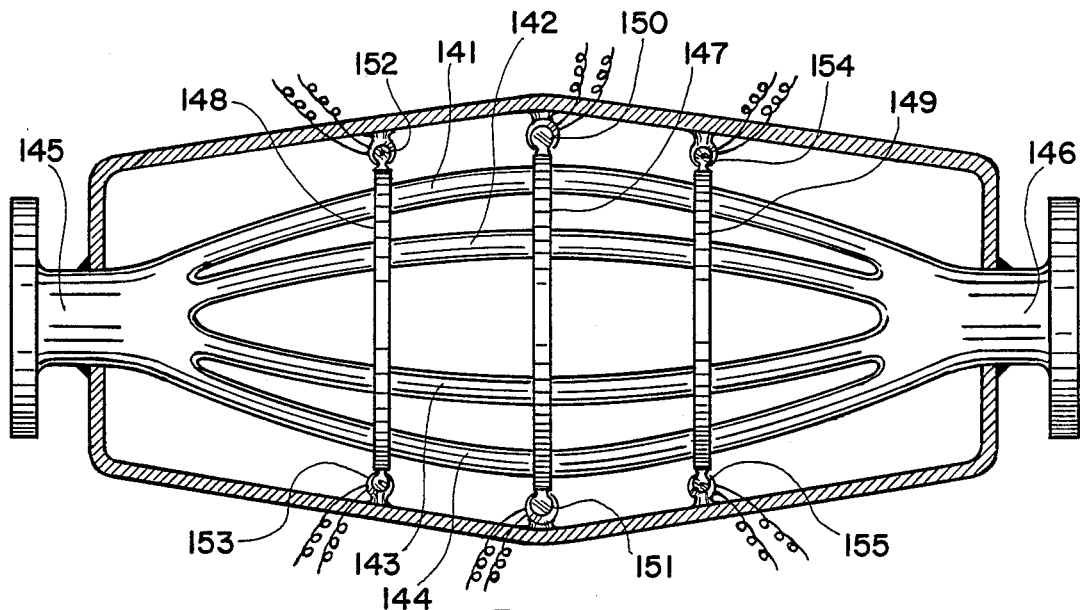
FIG. 17 illustrates a further embodiment of the convective inertia force flowmeter of the present invention comprising a plurality of flow passage conduits with built-in torsional flexibility.

In FIG. 17 there is illustrated a further embodiment of the convective inertia force flowmeter of the present invention wherein the torsional flexibility is provided by the flow passage conduits. The plurality of the curved flow passage conduits 141, 142, 143, 144, etc. disposed in a generally axisymmetric arrangement about the central axis of the flowmeter are fixedly connected to the two port conduits 145 and 146 at the two extremities thereof, which are joined together at the midsection by a first joining disc or ring 147 and at the middle of two halves thereof by a second and third joining discs or rings 148 and 149, respectively. The rotary vibrator including electromagnets 150 and 151 produces torsional vibrations of the joining disc or ring 147. The two motion detectors respectively including the transducers 152 and 153, and 154 and 155 measure the motions of the two joining discs or rings 148 and 149. The mass flow rate is determined from the antisymmetric component of the vibrations between the two joining discs or rings 148 and 149, as it is proportional to the mass flow rate.

Figure 18:
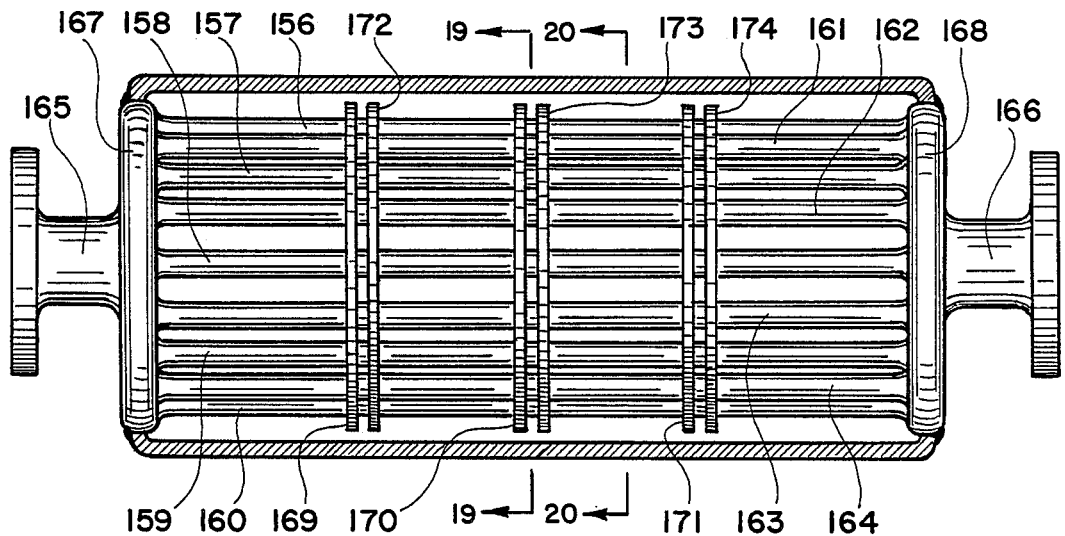
FIG. 18 illustrates an embodiment of the balanced convective inertia force flowmeter of the present invention comprising a plurality of flow passage conduits with built-in torsional flexibility.

In FIG. 18 there is illustrated a balanced version of the convective inertia force flowmeter shown in FIG. 17. Two sets of pluralities of flow passage conduits 156, 157, 158, 159, 160, etc. and 161, 162, 163, 164, etc. are disposed in a generally axisymmetric arrangement about the central axis of the flowmeter coinciding with the common central axis of the two port conduits 165 and 166, wherein the flow passage conduits of the first set and those of the second set are disposed in an alternating arrangement. The extremities of the flow passage conduits are rigidly connected to the two radially extending headers 167 and 168. The flow passage conduits of the first set are joined together by three joining discs or rings 169 in the first half, 170 at the midsection and 171 in the second half, while the flow passage conduits of the second set are joined together by three joining discs or rings 172 in the first half, 173 at the midsection and 174 in the second half. The rotary vibrator, which is not shown for the brevity of illustration, vibrates the two middle discs or rings 170 and 173 relative to one another in opposing directions. A pair of rotary motion detectors which are not shown for the brevity of the illustration respectively measure relative motions between the first pair of disc or rings 169 and 172, and 171 and 174. The mass flow rate is determined from the difference in the relative motions registered by the two motion detectors. It should be understood that the flow passage conduits may be fixedly connected directly to the two port conduits 165 and 166 without using the two headers 167 and 168 as demonstrated in FIG. 17 and that curved flow passage conduits may be employed in place of straight flow passage conduits as demonstrated in FIG. 17.

Figure 19:
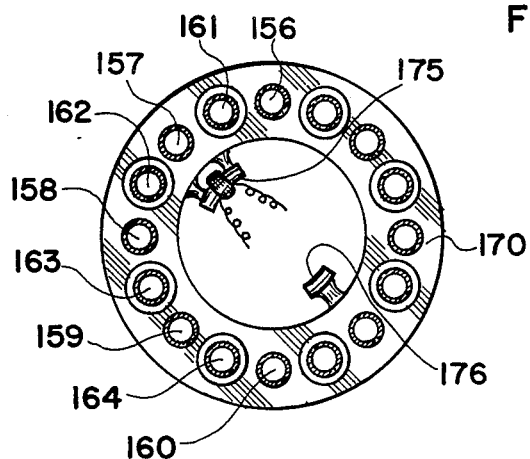
FIG. 19 illustrates a cross section of the embodiment shown in FIG. 18.

In FIG. 19 there is illustrated a cross section of the embodiment shown in FIG. 18 taken along plane 19-19 as whown in FIG. 18, which shows the middle disc or ring 170 joining flow passage conduits 156, 157, 158, 159, 160, etc. of the first set together, wherein the flow passage conduits 161, 162, 163, 164, etc. of the second set extend through over-sized holes included in the disc or ring 170. The electromagnet 175 affixed to the disc or ring 170 and alternatively attracting a ferromagnetic element affixed to the adjacent disc or ring 173, and a ferromagnetic element 176 affixed to the disc or ring 170 and alternatively attracted to an electromagnet affixed to the adjacent disc or ring 173 constitute the rotary vibrator.

Figure 20:
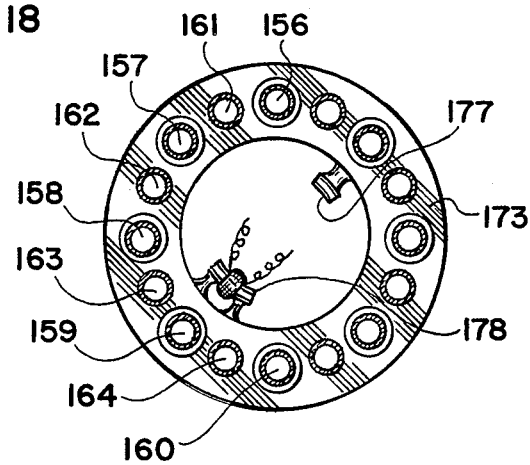
FIG. 20 illustrates another cross section of the embodiment shown in FIG. 18.

In FIG. 20 there is illustrated another cross section of the embodiment shown in FIG. 18 taken along plane 20-20 as shown in FIG. 18. The disc or ring 173 joins flow passage conduits 161, 162, 163, 164 etc. of the second set together, while flow passage conduits 156, 157, 158, 159, 160, etc. of the first set extend through the over-sized holes included in the disc or ring 173. The ferromagnetic element 177 and the electromagnet 178 affixed to the disc or ring 173 and respectively functioning in conjunction with the electromagnet 175 and the ferromagnetic element 176 shown in FIG. 19 constitute the rotary vibrator. The arrangement of the two pairs of the discs or rings 169 and 172, and 171 and 174 are same as the arrangement shown in FIGS. 19 and 20 with one exception being that the electromagnets and ferromagnetic elements of the rotary vibrator are now replaced with pick-up coils and magnetic targets of the rotary motion detector, respectively. Of course, other type of rotary motion detectors may be employed to measure the relative motions between the two discs or rings.

While the principles of the present invention have now been made clear by the illustrative embodiments, there will be immediately obvious to those skilled in the art many modifications of structures, arrangements, proportions, elements and materials, which are particularly adapted to the specific working environments and operating conditions in the practice of the invention without departing from those principles.

I claim:

1. A device for measuring rate of fluid flow comprising in combination:
   (a) a plurality of curved conduits disposed in a converging-diverging arrangement about an central axis of assembly with first extremities connected to a first port leg and second extremities connected to a second port leg, wherein distance from the central axis of assembly to each of the curved conduits is greater at the midsection of the curved conduit than at each extremity of the curved conduit;
   (b) a first interconnecting member joining together first halves of said plurality of curved conduits adjacent to the port leg, and a second interconnecting member joining second halves of said plurality of curved conduits adjacent to the second port leg;
   (c) means for rotatively vibrating midsections of said plurality of curved conduits about the central axis of assembly; and
   (d) means for measuring rotary vibrations of said first halves and said second halves of curved conduits; wherein mass flow rate through said plurality of curved conduits is determind from difference in the rotary vibrations about the central axis of assembly between said first halves and said second halves of said plurality of curved conduits.

2. The combination as set forth in claim 1 wherein said combination includes a third interconnecting member joining together midsections of said plurality of curved conduits.

3. The combination as set forth in claim 2 wherein said means for rotatively vibrating midsections of said plurality of curved conduits about the central axis of assembly exerts vibratory torque about the central axis of assembly onto said third interconnecting member.

4. A device for measuring rate of fluid flow comprising in combination:
   (a) a first plurality of curved conduits disposed in a converging-diverging arrangement about an central axis of assembly with first extremities connected to a first port leg and second extremities connected to a second port leg, wherein distance from the central axis of assembly to each of the curved conduits is greater at the midsection of the curved conduit than at each extremity of the curved conduit;

(b) a second plurality of curved conduits disposed in a converging-diverging arrangement about the central axis of assembly with first extremities connected to the first port leg and second extremities connected to the second port leg, wherein distance from the central axis of assembly to each of the curved conduits is greater at the midsection of the curved conduit than at each extremity of the curved conduit;

(c) a first interconnecting member joining together first halves of said first plurality of curved conduits adjacent to the first port leg, and a second interconnecting member joining together second halves of said first plurality of curved conduits adjacent to the second port leg;

(d) a third interconnecting member joining together first halves of said second plurality of curved conduits adjacent to the first port leg, and a fourth interconnecting member joining together second halves of said second plurality of curved conduits adjacent to the second port leg;

(e) means for rotatively vibrating midsections of said first plurality of curved conduits and midsections of said second plurality of curved conduits relative to one another;

(f) first means for measuring relative rotary vibrations about the central axis of assembly between said first halves of the first plurality of curved conduits and said first halves of the second plurality of curved conduits; and (g) second means for measuring relative rotary vibrations about the central axis of assembly between said second halves of the first plurality of curved conduits and said second halves of the second plurality of curved conduits;

wherein mass flow rate through said first and second pluralities of curved conduits is determined from difference in the two relative rotary vibrations about the central axis of assembly respectively measured by said first and second means for measuring relative rotary vibrations.

5. The combination as set forth in claim 4, wherein said combination includes a fifth interconnecting member joining together midsections of said first plurality of curved conduits, and a sixth interconnecting member joining together midsections of said second plurality of curved conduits.

6. The combination as set forth in claim 5 wherein said means for rotatively vibrating midsections of said first and second pluralities of curved conduits relative to one another about the central axis of assembly exerts vibratory torques about the central axis of assembly onto said fifth and sixth interconnecting members in opposite directions.

* * * * *